United States Patent [19]
Guimarães

[11] Patent Number: 6,044,640
[45] Date of Patent: Apr. 4, 2000

[54] PROCESS AND INSTALLATION FOR COOLING AIR

[76] Inventor: Edison Tito Guimarães, Praia de Flamengo, 278, apt 71, 22210-030 - Rio de Janeiro, RJ, Brazil

[21] Appl. No.: 09/011,134
[22] PCT Filed: Mar. 8, 1996
[86] PCT No.: PCT/BR96/00006
§ 371 Date: Mar. 23, 1998
§ 102(e) Date: Mar. 23, 1998
[87] PCT Pub. No.: WO97/06361
PCT Pub. Date: Feb. 20, 1997

[30] Foreign Application Priority Data
Aug. 9, 1995 [BR] Brazil ............................. 9503588

[51] Int. Cl.⁷ ................................................. F02C 1/00
[52] U.S. Cl. .................. 60/39.02; 60/39.511; 60/39.512; 60/728
[58] Field of Search ............................... 60/728, 39.511, 60/39.512, 39.02

[56] References Cited

U.S. PATENT DOCUMENTS

| | | |
|---|---|---|
| 3,349,248 | 10/1967 | Garnier ............................... 290/2 |
| 3,785,145 | 1/1974 | Amann ............................... 60/39.24 |
| 3,844,737 | 10/1974 | Macriss et al. . |
| 4,426,853 | 1/1984 | Mitani et al. . |
| 5,148,670 | 9/1992 | Birch et al. ............................... 60/39.142 |
| 5,193,352 | 3/1993 | Smith et al. . |
| 5,203,161 | 4/1993 | Lehto . |

FOREIGN PATENT DOCUMENTS 2318389 2/1977 France .

OTHER PUBLICATIONS

Journal of the Institution of Engineers (India), vol. 57, No. me-1, Jul. 1976, India, pp. 266–272, XP002005497, V. Charan, et al.: "Use of Dehumidifier and Heat Exchanger with an Evaporative Cooler."

*Primary Examiner*—Timothy S. Thorpe
*Assistant Examiner*—Ehud Gartenberg
*Attorney, Agent, or Firm*—Smith, Gambrell & Russell, LLP

[57] ABSTRACT

The present invention refers to a process and installation for cooling combustion air of gas turbines, in which the humidity contents of the air is first reduced in a dehumidifier (7, 7') by means of a first external fluid (4), or the discharge gases of the turbine, then the air is cooled in a cooler (11, 11') by means of a second external fluid (12), reaching approximately the same initial dry bulb temperature and followed by cooling, after at least one dehumidification stage, the air being then rehumidified. in a saturator (13).

11 Claims, 6 Drawing Sheets

PROCESS AND INSTALLATION FOR COOLING AIR

TECHNICAL FIELD

The present invention refers to a process and an installation for cooling combustion air of gas turbines.

Nowadays, the use of gas turbine for the generation of electric power is considerably increasing worldwide, since not all countries have abundant water resources and furthermore the technology of nuclear power station is very expensive and complicated.

Gas turbines are extremely sensitive to the ambient air temperature. The higher the temperature of the feed air for combustion, the lower the maximum power produced by the turbine will be, and also its efficiency will be lower too, causing higher fuel consumption per KW of electric power produced. Generally, this problem increases in the summer months, exactly when the power consumption is higher.

Due to the variations of power with respect to the temperature of the air for combustion, a dry bulb temperature of 15° C. was established by the ISO international norms, for normalization of the nominal values of gas turbine power. Taking this reference as a basis, it has been found that the power of a turbine operating at 35° C. may be reduced by as much as 17%.

PRIOR ART AND SHORTCOMINGS OF THE PRIOR ART

Thus, in order to increase the efficiency of the turbine, combustion air-cooling systems are employed, which consists basically of the following:

a) a common cooling system with compressors (reciprocating, screw or centrifugal) either provided or not with a (water or ice) thermal storage system;

b) absorption units, employing either steam or hot fluids as energy source for obtaining the cooling effect.

In the combustion air-cooling systems that have thermal storage, ice is produced during the night using a portion of the power of the turbine itself, storing the ice in appropriate tanks. On the next day the ice is used in the peak hours to cool the turbine combustion air, in order to increase its efficiency and power.

The first disadvantage of the existing technology for combustion air cooling system is the fact that the initial installation cost is high.

Another disadvange consists of the fact that the operation cost of these systems is quite high, since it consumes energy from the turbine itself, which will be only partially recovered. In such systems a great loss of energy occurs due to the inevitable moisture condensation while cooling the air. The energy required for the condensation of the air moisture is in most cases higher than that necessary to the reduction of the air temperature, i.e., more than a half of the consumed energy is used without any useful effect.

Document U.S. Pat. No. 5,203,161 describes a method and arrangement for cooling air fed to gas turbines and presents, according to the figure on the cover page, an absorption chiller (486) for initial cooling of the air in the water spray cooler (480); an absorption chiller (451) for cooling the liquid desiccant contactor (440); a vapor compression chiller (430) for cooling the air in the chiller coil (425) and a liquid desiccant system comprising lines (458, 460, 462) and a desiccant regenerator (459). The first disadvantage of this arrangement consists in the fact that the absorption chiller (486 and 451) and the vapor compression chiller (430) need external energy to carry out their functions. Another disadvantage is the fact that the arrangement presents a complicated system of liquid desiccant.

Document U.S. Pat. No. 5,193,352 describes an apparatus and method for cooling air of a turbine (20) which actuates a generator (19). As in the prior cited document, this apparatus also presents the disadvantage that cooling of the air is carried out by devices, such as IMP-ice making plant (62), DCC-direct contact chiller (12) and TSU-thermal storage unit (60), which need external energy to carry out their functions.

Document U.S. Pat. No. 3,844,737 describes a desiccant system for an air-conditioning system, which comprises a heater for dehumidifying the air, i.e., the device presents the disadvantage that it needs external energy to carry out its function.

Document U.S. Pat. No. 4,426,853 describes an air continioning system, comprising a heat exchanger (18) which uses external hot air to dehumidify the air of the air-conditoning system. The external air used in the heat exchanger is obtainable through a complicated and expensive system of solar heat collection (25, 26), i.e., the air conditioning system needs external power to carry out its function.

Therefore, in the technology according to the prior art, external energy must be supplied, with a consequent increase in operating costs.

OBJECT OF THE INVENTION

The invention has the objective of increasing the turbine efficiency and power availability, thereby reducing the temperature of the combustion air of the turbine. air.

SUMMARY OF TEE INVENTION

Such an objective is achieved by using a process for cooling the air, which comprises:

a) at least one dehumidifying stage with the consequent temperature increase of the air, followed by cooling; and b) an air-humidifying stage with the consequent cooling.

In order to carry out the process, an installation is also foreseen, which comprises: a) an air dehumidifier;

b) inlet means for a first external fluid to enter into said dehumidifier;

c) outlet means for said first external fluid to leave the dehumidifier with the consequent removal of the humidity from the dehumidifier;

d) an air cooler cooled by a second external fluid and placed so as to receive the dehumidified air from the dehumidifier; and e) an air saturation device placed so as to humidify the air which comes out from the said cooler.

Thus, the combustion air at a temperature of 35° C., for example, is introduced into the dehumidifier, where its moisture content is reduced by the action of first external fluid, which consists of the turbine (and heat recovery boiler) discharge gases at a temperature range of 130° C.–170° C. As a result of this step of dehumidifying, the air temperature rises, and so the air has to be cooled in a cooler, where after the cooling it reaches approximately the same initial dry bulb temperature. The second external fluid, which acts in the cooler, consists of ambient air or water (as a heat sink). After at least one stage of humidity reduction followed of cooling, the air is rehumidified in the saturator through recirculated water, in which it is cooled down to a temperature below 20° C.

The great advantage provided by the invention, in addition to the higher efficiency, consists of the fact that it uses an energy that is usually wasted. The hot discharge gases that are usually expelled to the atmosphere through the turbine chimneys and/or recovery boilers associated to the turbine, will be used in the dehumidifier. Therefore, the whole energy required for the air cooling process (except that employed in the movement of the fluids) comes from the discharge gases flow.

Another great advantage of the invention is that the installation cost is lower than the mechanical cooling systems used in the prior art.

A third advantage of the invention is the fact that the fossil fuel consumption is reduced, due to the increase of the turbine efficiency, which reduces the environmental impact of the electric energy generation using gas turbines. The electric energy production is nowadays one of the greatest causes of the environmental pollution.

In order to achieve higher efficiency levels of the cooling system, two or more air-dehumidifying stages can be employed, followed of cooling.

DETAILED DESCRIPTION OF THE INVENTION

Figure 1:
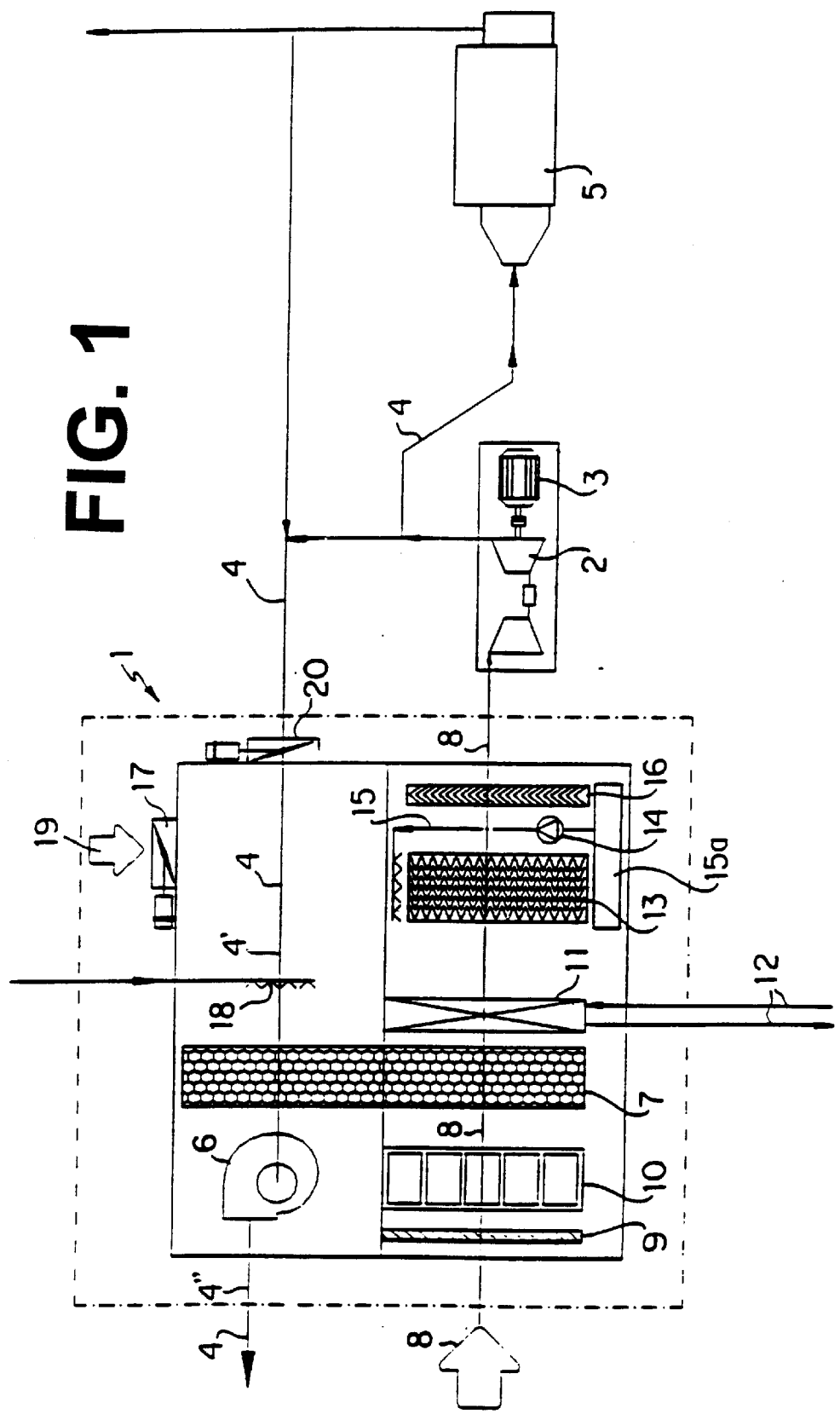
Figure 2:
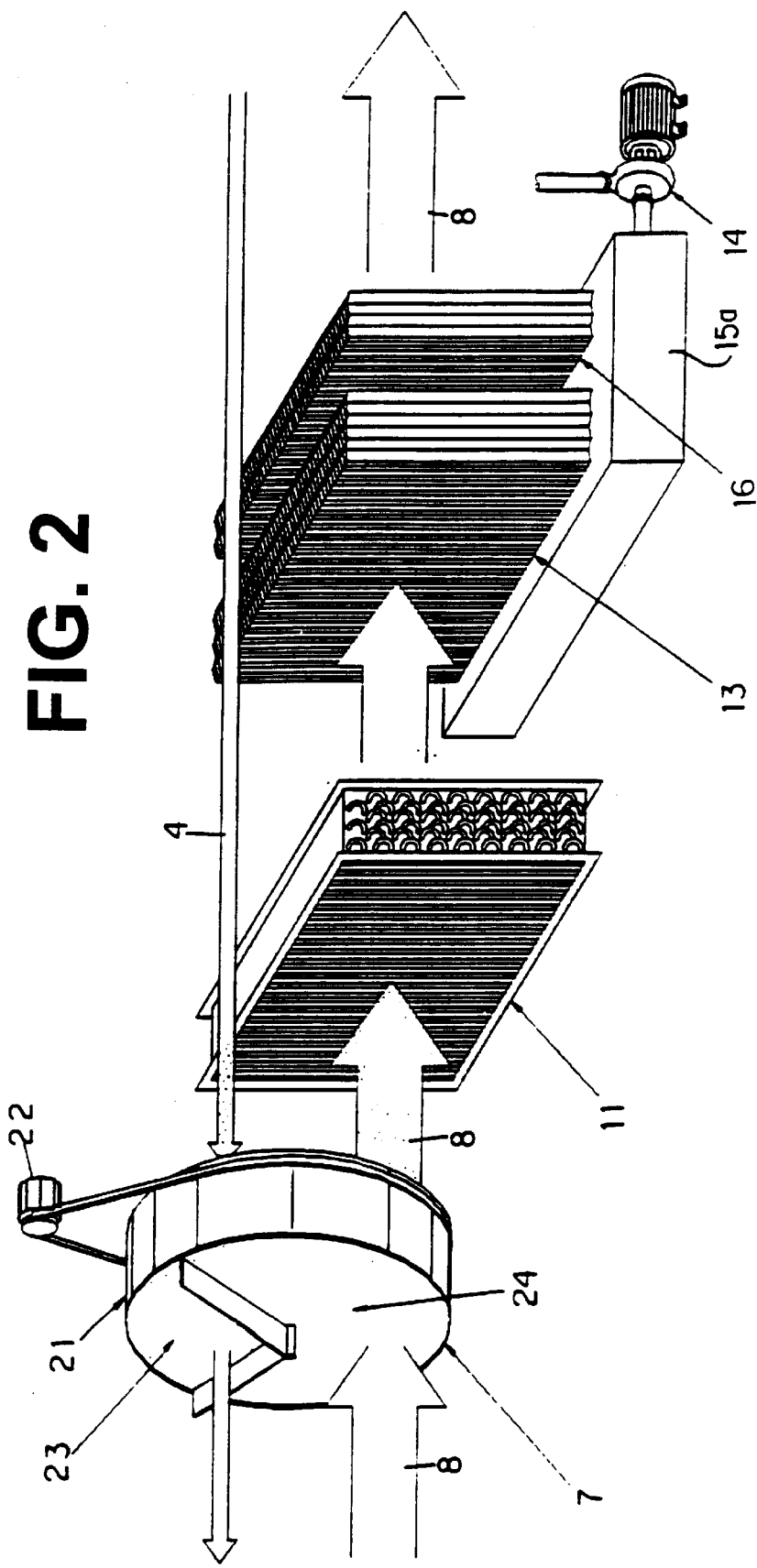
Figure 3:
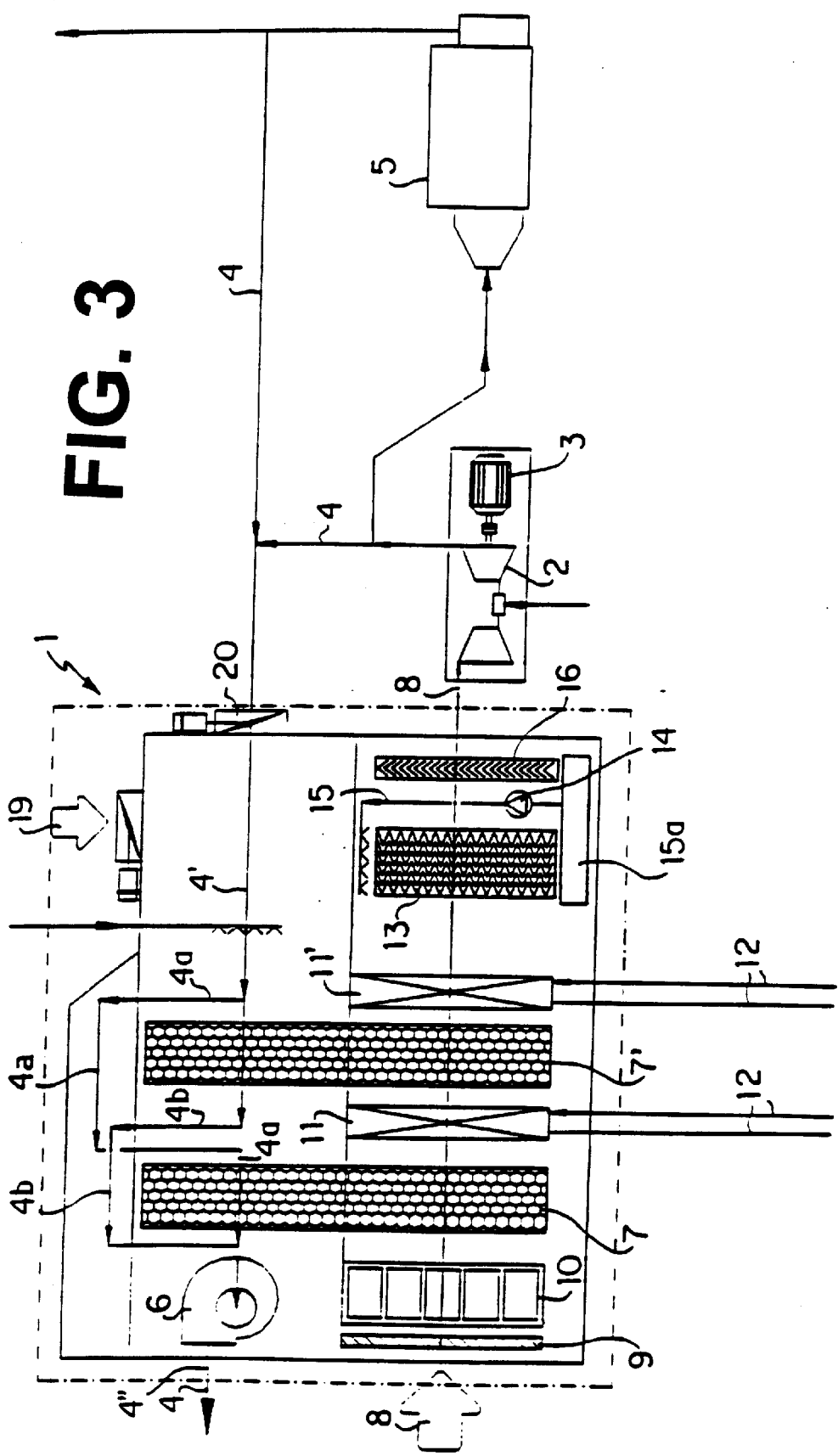
Figure 4:
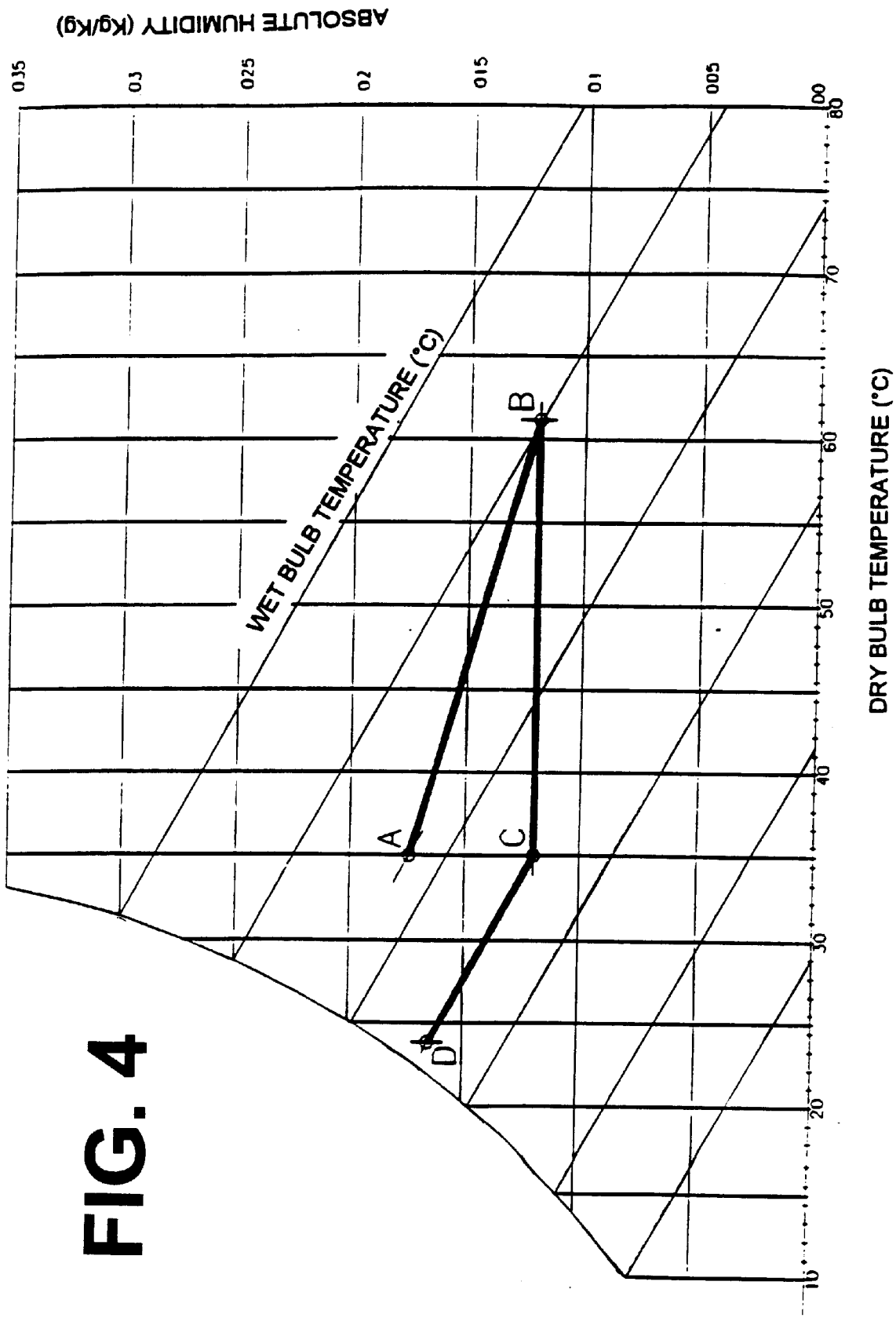
Figure 5:
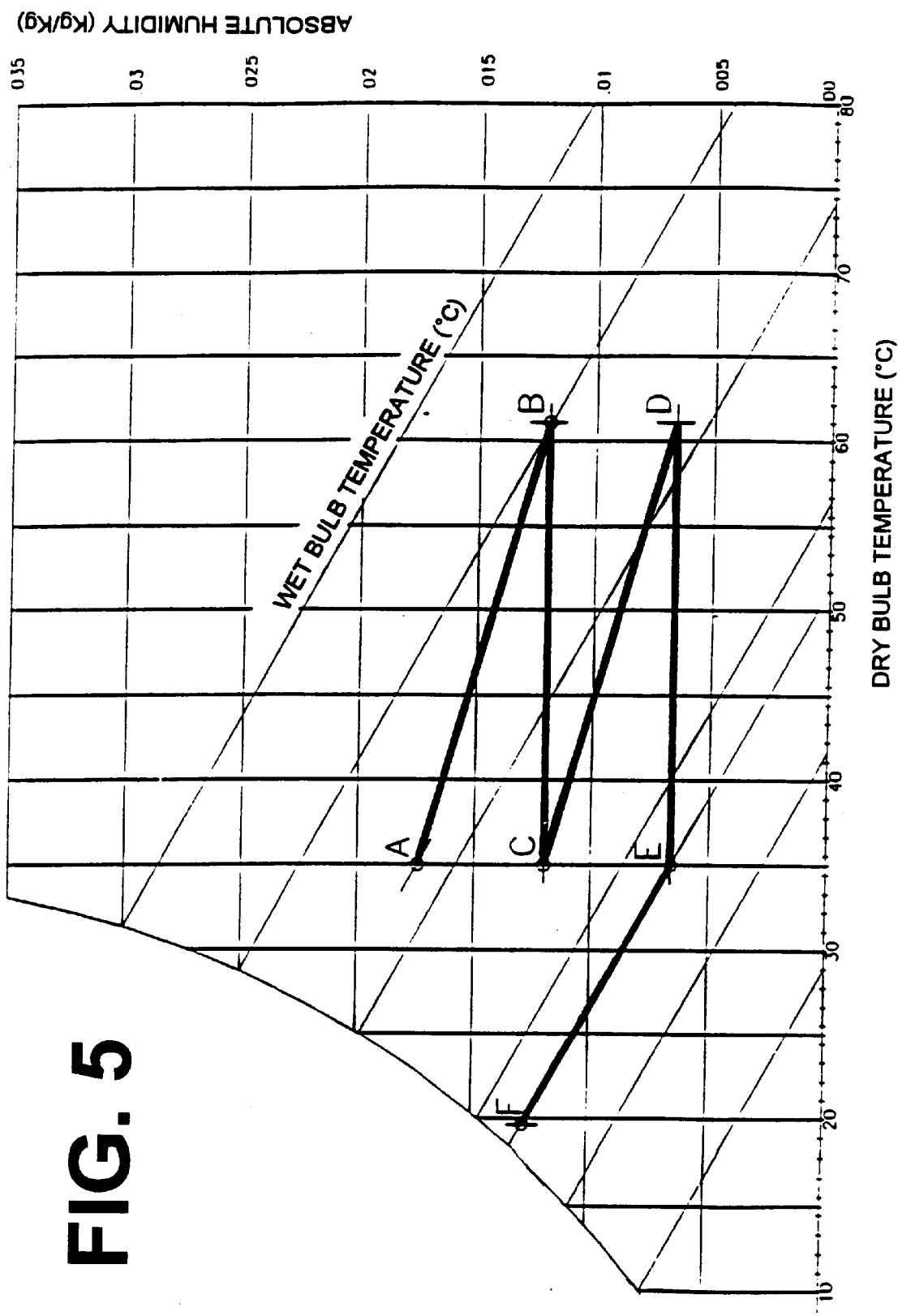

The invention will now be described in greater detail, by way of example, with reference to the accompanying drawings:

FIG. 1 - scheme of an air-cooling installation associated to a turbine in accordance with a preferred embodiment of the invention, with a dehumidify stage followed of cooling;

FIG. 2 - a schematic view of the installation, mainly showing the basic components;

FIG. 3 - the scheme of the installation of FIG. 1 with two dehumidifying stages, followed of cooling;

FIG. 4 - a cooling cycle diagram with one dehumidifying stage;

FIG. 5 - a cooling cycle diagram with two dehumidifying stages; and

Figure 6:
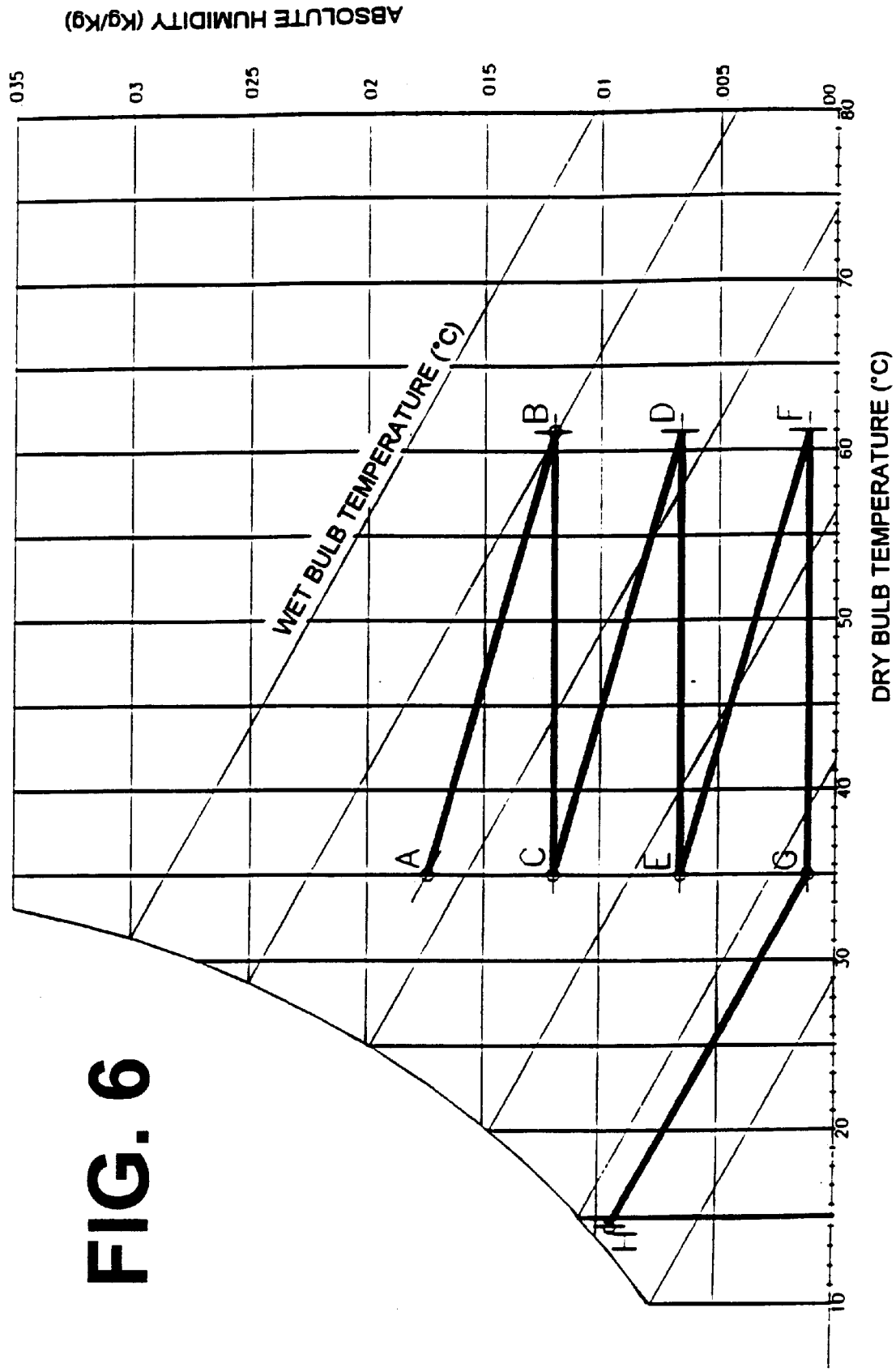

FIG. 6 - a cooling cycle diagram with three dehumidifying stages;

FIG. 1 shows an preferred embodiment example of the invention, with one dehumidifying stage, followed by cooling, comprising an air cooling installation 1 associated to a turbine 2, which drives a generator 3 and the exhaust gases 4 of which can be used directly in the installation 1 or after passing through a recovery boiler 5.

In the installation 1 a fan 6 draws the exhaust gases 4, which pass through a dehumidifier 7 and are expelled to the atmosphere. The gases conduction duct consists of a first part called as dehumidifier inlet means (4') and a second part called as dehumidifier outlet means (4").

As regards the turbine combustion air, the following procedure occurs, given in step, in order to facilitate the understanding:

a) simultaneously to the discharge of exhaust gases the turbine draws ambient air 8, which, at the beginning of its course through the installation 1, initially passes through a pre-filter 9 and through a high efficiency filter 10;

b) after filtration, the ambient air 8 or turbine combustion air 8 passes through the dehumidifier 7, where it is dehumidified, losing a great amount of water vapor. In this operation, it also gains heat, increasing its temperature up to about 60° C., and now it needs to be cooled;

c) the cooling is effected by a heat exchanger 11, where natural cooling means 12 are used (without employing mechanical refrigeration), as for example water or outside air at room temperature. The heat exchanger may be an air-air one, where the heat is transferred to another external air flow, of the type with fins in cross flow, or with sensible heat transfer rotatory cylinders, or of the "heat-pipe" finned coil type; or it can be an air-water heat exchanger using, for example cooling coils, where the cooling water comes from cooling towers, rivers, wells, the sea, etc., or other types of heat exchangers with these fluids;

d) air flow 8 after passing through the heat exchanger 11 is at a temperature close to that of the external environment, but with a much lower moisture content;

e) next, the air flow 8 passes through an adiabatic saturator 13, which basically consists of an air humidifying equipment, raising its humidity virtually up to the saturation point. The saturator 13 is an equipment encountered also in the industry and can be an air-washer with spray-nozzle array or a saturator with an element of paper, wood or another element which could promote the close air-water contact. This contact is intended to permit evaporation of the water and the consequent absorption thereof by the air flow 8 until said flow is virtually saturated.

From the thermodynamic point of view, the evaporation of the water is carried out isoenthalpically, with the air flow 8 supplying the heat required for evaporation of the water 15, thus being cooled. The lower the humidity of the air before entering the saturater 13, the higher the degree of cooling of the air 8 achieved in this operation. For this reason, the air has been previously dried in the dehumidifier 7. This degree of cooling is proportional to the depression of the wet bulb of the air, that is to say, proportional to the difference between the dry bulb temperature and the wet bulb temperature of the air.

Thus, at this point, right after the saturator 13, the air flow 8 is at a dry bulb temperature lower than the initial temperature, that is to say lower than the temperature of the ambient air. This difference can be better observed in the diagrams of FIGS. 6, 7, and 8.

f) a small pump 14 effects the circulation of water 15 in the saturator 13 from a tank 15a, so as to maintain a continuous evaporation of the water;

g) finally, the air flow 8 goes through a drop eliminator 16 and then enters the turbine, thus closing the cycle.

The figure further shows the components 17 and 18, which serve to control, respectively, the maximum and minimum limits of the temperature of exhaust gases. The component 17, for instance, is a butterfly valve, automatically operated by the action of a temperature controller to open the entry of outside air 19 when the temperature of the exhaust gases 4 is too high. The component 18 is, for instance, either a fuel burner or an electric heating coil, which is also actuated by the action of a temperature controller when the temperature of the exhaust gases needs to be raised.

Of course, in the case of systems called "open cycle", which do not have a heat recovery boiler, the exhaust gases 4 are expelled directly from the turbine 2 into the cooling installation 1, at higher temperatures. In these cases it is important to control the temperature by means of the component 17.

The figure further shows the component 20 for controlling the flow of exhaust gases, in order to adjust the dehumidifying capacity by reducing the mass of gases going through the dehumidifier 7. This component is, for instance, a butterfly valve automatically operated.

The components 17, 18, and 20 can be located, for instance, in the duct (4') conducting exhaust gas to the dehumidifier.

FIG. 2 is a schematic view of the installation of FIG. 1, showing principally its basic components, namely: dehumidifier 7, heat exchanger 11 and saturator 13. The figure shows, even more clearly, the flow of the exhaust gases 4 and of the combustion air 8 of the turbine.

The dehumidifier 7 is also a standard product available from several manufacturers and may be, for instance, of the type with a rotatory drum or the type with hygroscopic washers. In the present figure, it is shown as the type with rotatory drum and is constituted by a rotatory drum 21, actuated by an electric motor 22. Inside the drum there is a hygroscopic substance, for instance silica, which is dried or reactivated in the reactivation area 23 by the exhaust air 4. The sector 24 is where the drying of the combustion air flow 8 occurs, since the dried hygroscopic substance absorbs the humidity of the air.

FIG. 3 shows a second embodiment of the invention, in which, in this case, two stages of dehumidification followed by cooling are utilized. As already said previously, the drier the air before going through the saturator, the lower its final temperature after it is humidified. In this way, two or more dehumidification stages are carried out, in order to reduce the moisture contents of the air as much as possible.

The greater the number of stages, the lower the combustion air temperature at the inlet of the turbine. The determination of the ideal number of stages will depend upon a technical and economical analysis of the system, considering the weather conditions of the installation site. Basically, since the relationship of masses between the "combustion air" and the "reactivation air" in a dehumidifier is of about 1:4, it will be possible to carry out three drying stagess with the usually available mass of exhaust gases, since the same mass of air admitted in the aspiration of the turbine is available in its discharge.

Thus, as can be seen from FIG. 3, in the multiple stages cycles the exhaust gases 4 are arranged in parallel into the reactivation area 23 of the dehumidifiers 7, as shown by the partial flows of exhaust gas 4a and 4b.

FIG. 3 also shows a second dehumidifier 7', followed by a second heat exchanger 11', which also uses natural means 12 for cooling air. The other components of FIG. 3 are identical to those of FIG. 1.

FIG. 4 shows the cycle of air cooling with a dehumidifying stage, plotted on a psychrometric chart, for an outdooor temperature of 35° C. (dry bulb) and 26.5° C. of wet bulb temperature. The points and segments identify the following, on the basis of the installation of FIG. 1:

point A: indicates the condition of outside air before entering the cooling installation 1, that is to say, a temperature of 35° C. and 0,017 Kg/Kg of humidity contents;

segment AB: represents the dehumidification in the dehumidifier 7;

point B: indicates the condition of the air after passing through the dehumidifier. It can be seen that the degree of humidity of the air has dropped to 0.012 Kg/Kg and its dry bulb temperature has risen to approximately 60° C.;

segment BC: represents the cooling of the air in the heat exchanger 11;

point C: indicates the condition of the air leaving the heat exchanger 11. It can be seen that its dry bulb temperature has dropped to approximately the same temperature of point A, while maintaining the humidity content of 0,012 Kg/Kg, that is to say, lower than that of point A;

segment CD: represents the humidification of the air in the saturator 13;

point D: indicates the condition of the air leaving the saturator 13 and ready to be admitted in the turbine. It can be seen that its humidity has risen and its dry bulb temperature has dropped from 35° C. to approximately 23° C.

FIG. 5, on the basis on the installation of FIG. 3, shows a air-cooling cycle with two dehumidifying stages, plotted under the same conditions of outside air of FIG. 6. With reference to FIG. 6, one can see that the second dehumidifying stage (carried out in the dehumidifier 7') is indicated by the segment CD and is followed by a second cooling DE (carried out in the heat exchanger 11'), while the humidification of the air (carried out in the saturator 13) is represented by segment EF. In this case, it is noted that the temperature of the combustion air of the turbine has dropped from 35° C. (outside air temperature) to appoximately 20° C. at the admission of the turbine.

FIG. 6 shows a cooling cycle with three dehumidification stages, plotted under the same conditions of outside air of FIG. 4. With reference to FIG. 5, one can see that the third dehumidification stage is indicated by segment EF, followed by a third cooling represented by segment DE, while the humidification of the air is represented by segment GH.

In this case, it is noted that the temperature of the combustion air of the turbine has dropped from 35° C. (outside air temperature) to approximately 15° C. at the admission of the turbine. Although no installation with three steps is represented in the figures, one more dehumidifier followed by a heat exchanger should merely be added to the installation of FIG. 3.

Besides the embodiments presented above, the same inventive concept can be applied to other alternatives or possibilities of utilizing the invention. For instance, the invention can also be used in gas turbines for propelling ships.

It should be understood that the scope of the present invention should be limited only by the terms and interpretation of the following claims.

I claim:

1. A process for cooling combustion air of a gas turbine, comprising at least one dehumidifying stage with consequent heating of the air, followed by cooling, characterized in that after said cooling there is an air-humidifying stage with consequent cooling, and wherein the dehumidifying of the air is carried out by discharge gases of the turbine.

2. An installation for cooling combustion air of a gas turbine comprising:
   a) a dehumidifier (7, 7') of air (8);
   b) inlet means (4') for a first external fluid (4) to enter into said dehumidifier (7, 7');
   c) outlet means (4") for said first external fluid (4) to come out of the dehumidifier (7) with consequent removal of the air humidity from the dehumidifier;
   d) an air cooler (11, 11') cooled by a second external fluid (12) and placed to receive the dehumidified air (8) from the dehumidifier;
   characterized in that a saturator (13) is placed to humidify the air that comes out of the cooler (11, 11'), and in that the first external fluid (4) which acts upon the dehumidifier (7, 7') is discharge gas from the turbine.

3. A process in accordance with claim 2, wherein the dehumidification of the ambient air (8) is carried out in a dehumidifier (7,7') by means of a first external fluid (4), with the consequent raising of the temperature of the air, the cooling of the air is carried out in a cooler (11, 11') by means of a second external fluid (12), and the humidification of the air (8) is carried out in a saturator (13) by means of recirculated water (15), characterized that the first external fluid (4) are the discharge gases of the turbine.

4. A process in accordance with claim 1, characterized in that it has two or three air-dehumidifying steps, each followed by cooling, and the second external fluid (12) is water or air at room temperature.

5. An installation in accordance with claim 2, characterized in that the dehumidifier (7, 7') is of a rotary drum type or of the type with hygroscopic washers.

6. An installation in accordance with claim 2, characterized in that the air cooler (11, 11') is a heat exchanger, whose second external fluid (12) for cooling is water or air at room temperature.

7. Installation in accordance with claim 2, characterized by having a control device for controlling the high temperature of the discharge gases (17) which are incident on the dehumidifier (7, 7').

8. An installation in accordance with claim 7, characterized in that the device for controlling high temperature of gases (17) is a valve automatically operable, for opening an inlet of outside air (19).

9. An installation in accordance with claim 2, characterized by having a device for controlling the flow of exhaust gases (20) which fall onto the dehumidifier.

10. An installation in accordance with claim 9, characterized in that the device for controlling the flow of exhaust gases (20) is an automatically operated valve.

11. An installation in accordance with claim 2, characterized in that the device for controlling high temperature of gases (17) is a valve automatically operable for opening the inlet of outside air (19).

* * * * *